T. R. CRAMPTON.
Revolving Puddling-Furnace.
No. 222,461. Patented Dec. 9, 1879.
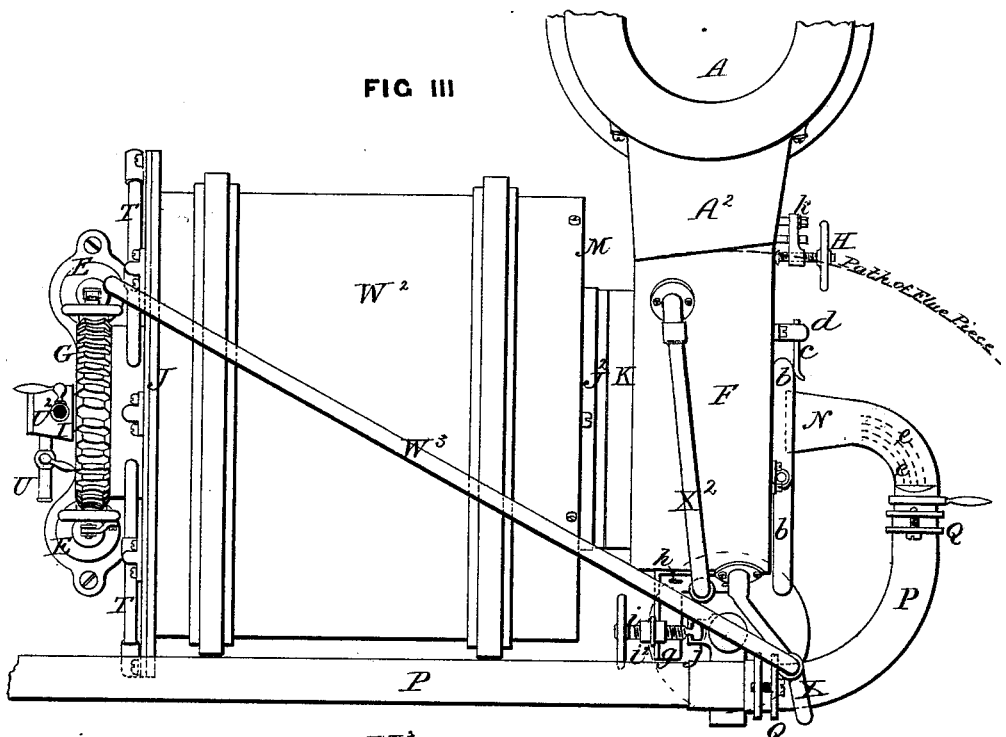
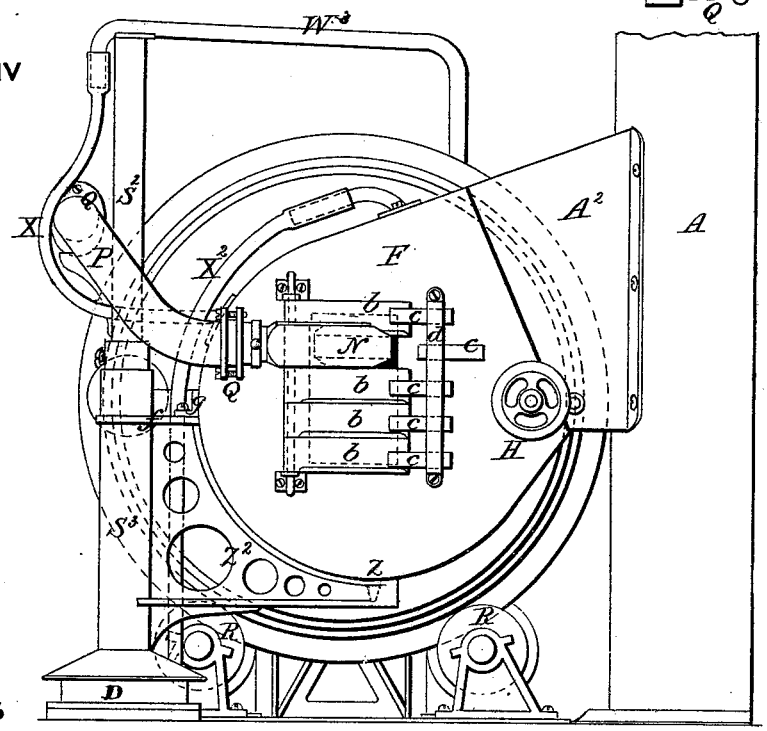

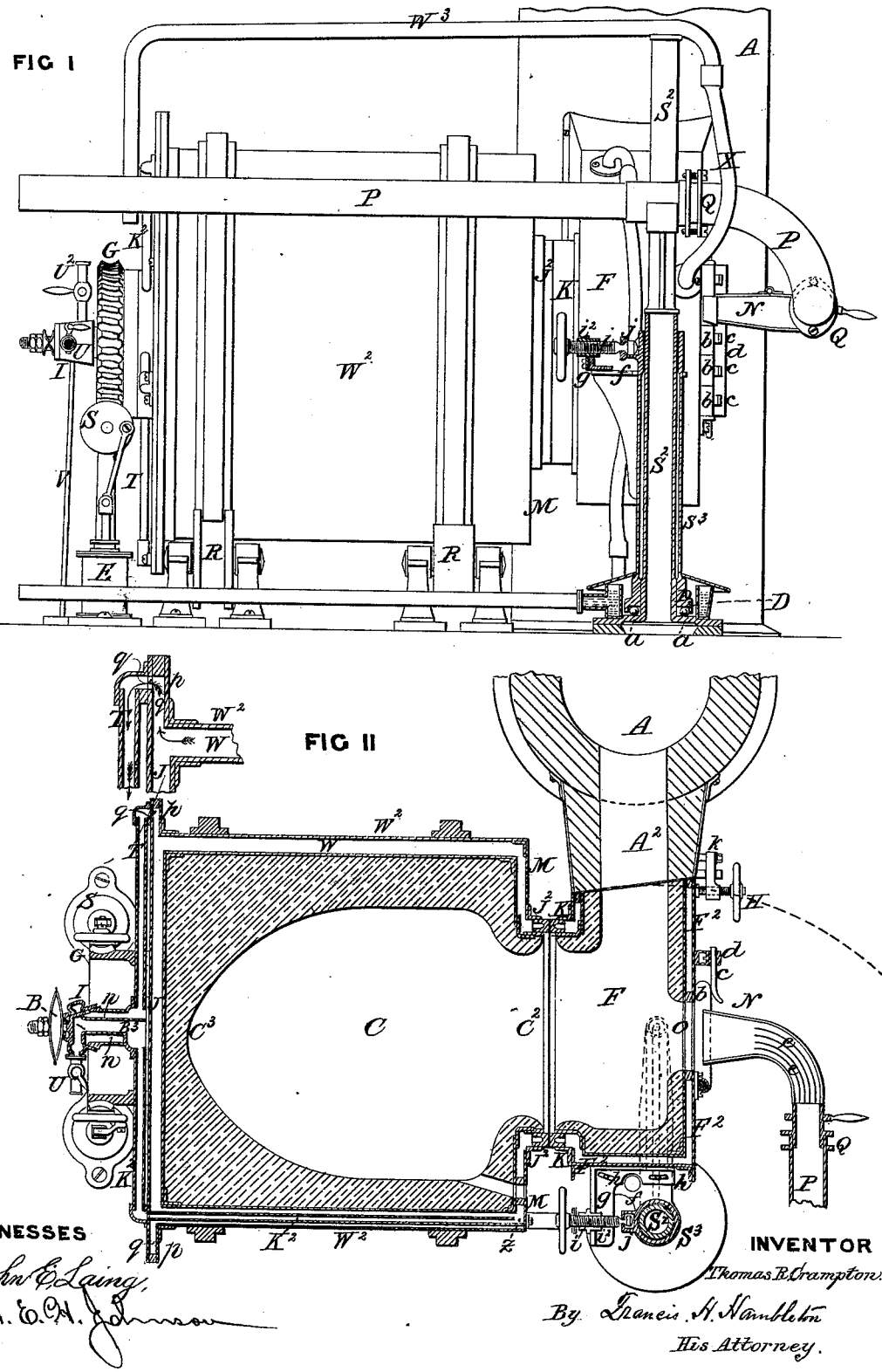
T. R. CRAMPTON.
Revolving Puddling-Furnace.
No. 222,461. Patented Dec. 9, 1879.

T. R. CRAMPTON.
Revolving Puddling-Furnace.
No. 222,461.   Patented Dec. 9, 1879.
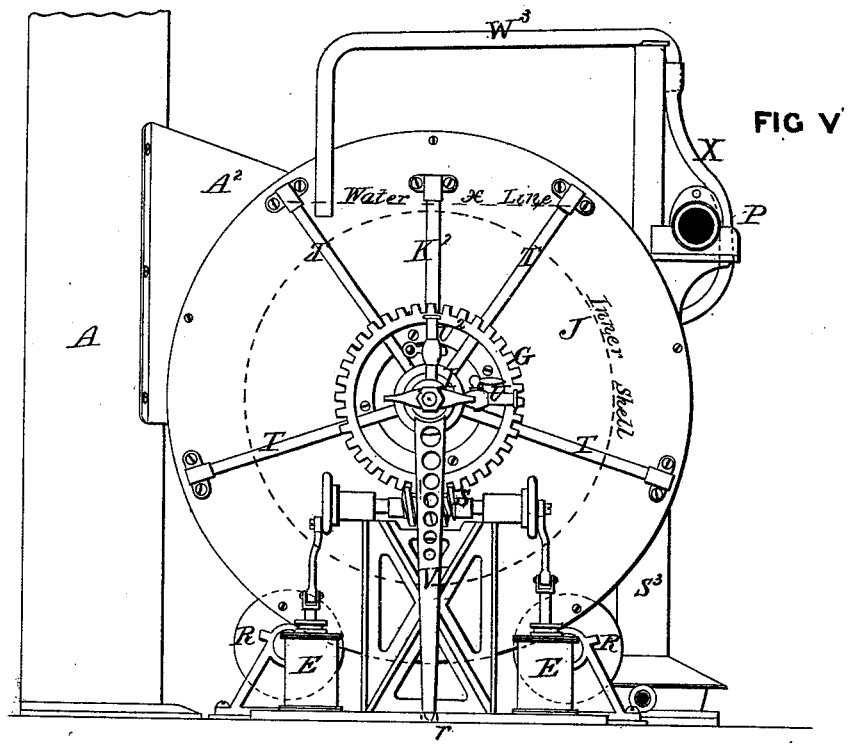
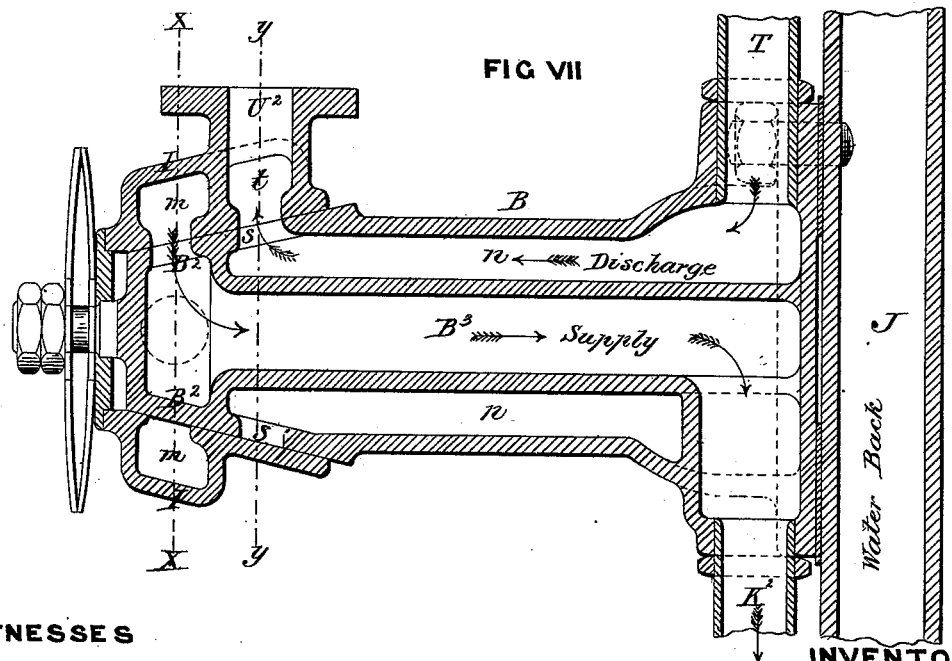

T. R. CRAMPTON.
Revolving Puddling-Furnace.
No. 222,461.       Patented Dec. 9, 1879.
4 Sheets—Sheet 4.
FIG VI
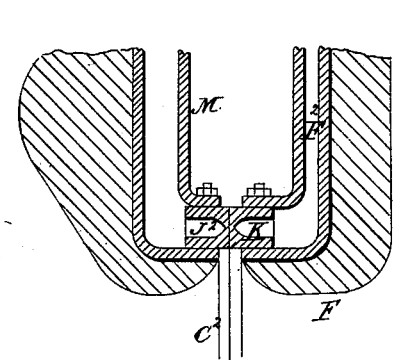
FIG VIII
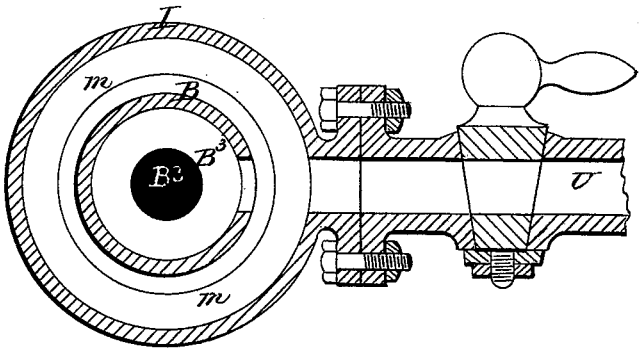
FIG IX
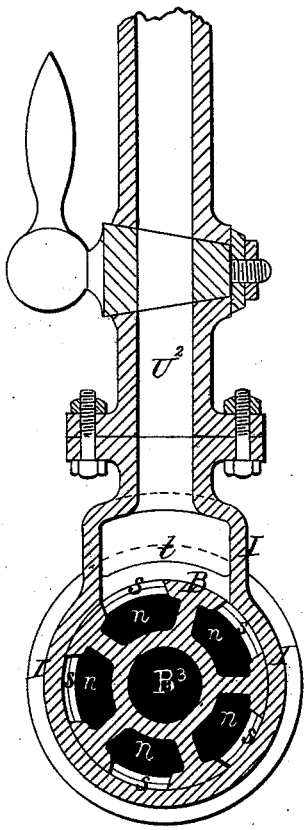
FIG X
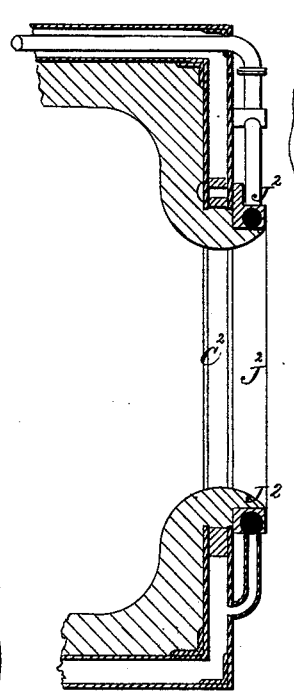
FIG XI
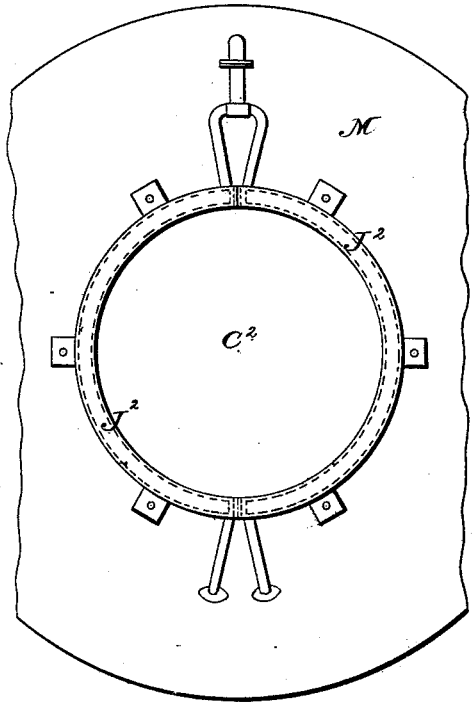
WITNESSES
John E. Laing.
A. W. N. Johnson
INVENTOR
Thomas R. Crampton
By Francis H. Hambleton
His Attorney.
N. PETERS, PHOTO-LITHOGRAPHER, WASHINGTON, D. C.

UNITED STATES PATENT OFFICE.

THOMAS RUSSELL CRAMPTON, OF WESTMINSTER, COUNTY OF MIDDLESEX, ENGLAND.

IMPROVEMENT IN REVOLVING PUDDLING-FURNACES.

Specification forming part of Letters Patent No. 222,461, dated December 9, 1879; application filed May 5, 1875; patented in England, December 3, 1869, March 28, 1872, and November 12, 1873.

*To all whom it may concern:*

Be it known that I, THOMAS RUSSELL CRAMPTON, of Westminster, in the county of Middlesex, England, have invented certain new and useful Improvements in Revolving Furnaces for Puddling, Reheating, and the Manufacture of Steel, of which the following is a specification.

The subject-matter claimed in this patent is based primarily upon inventions respectively described in English patents granted to me December 3, 1869, March 28, 1872, and November 12, 1873, and patents granted by the United States February 7, 1871.

In the English patent of 1869 and in the American patents of 1871 are described various modifications of fixed furnaces and the manner by which powdered fuel and air are injected at one end into such furnaces, the products of combustion returning and passing out at the same end.

In the English patents of 1872 and 1873 above referred to are described various modifications of revolving furnaces and a mode of cooling them, the furnace of the last-named English patent being described as being applicable to making wrought-iron and puddled steel directly from cast-iron or from iron ores, or for making cast-steel, or for melting, or for other purposes.

In my present invention I employ powdered fuel and air in connection with a puddling-furnace consisting of a single revolving chamber, and combined with an uptake or flue-piece, through which the fuel to heat the furnace is injected before undergoing combustion or being submitted to heat, in which chamber the fuel is converted into gas and combustion takes place in the immediate presence of the material under treatment.

In such combination of the working-chamber with a single flue-piece the latter serves primarily as the means of forming the communication with the chimney, and through which flue-piece both the ingress of fuel and the egress of the products of combustion are effected through one and the same opening, and without divisions in the flue-piece, while at the same time such flue-piece constitutes the door to the working and combustion chamber proper.

A revolving puddling-furnace having one end only open is not claimed in this patent, as it has been before used in combination with a double flue-piece and fixed furnace with grate-bars, &c., through one division of which flue-piece flame generated from solid fuel enters, and makes its exit through the other, impinging or reverberating upon the material under treatment in the meantime.

The fuel and air are injected through the flue-piece, pass through the flue-opening into the furnace, the products of combustion returning through the same undivided opening in the furnace and the flue-piece into the chimney, thereby permitting a simple construction of furnace, and enabling all those separate appliances employed in connection with ordinary furnaces for generating gas and flame, or for burning solid fuel on grate-bars, to be entirely dispensed with, thus avoiding the great expense incidental to their first cost and subsequent maintenance. Besides this, great economy of fuel is effected by all combustion taking place in the immediate presence of the material under treatment, instead of generating flame or gas in separate or fixed chambers and conducting the flame in and out of a revolving chamber.

Another important feature in my invention consists in an improvement in the method of effecting the constant application and circulation of water throughout the double shell of the revolving furnace, as described in my English patent of 1872—that is to say, a revolving furnace provided with a water-space at any and all points liable to distortion or destruction from heat, and the construction and combination by which this cooling circulation is effected. This is especially important at the ends of the furnace, where the heat impinges first with great intensity upon the closed end, but with still more disastrous effect at the open end, or between the revolving part of the furnace and that part of the apparatus which is non-revolving whether the furnace be revolving or standing, thereby preventing that distortion of furnace and joint-ring, and consequent excessive wear and tear to which all other revolving furnaces are liable. This feature of my invention also embraces a water-circulation within or in contact with the joint-ring or wearing-surface of the revolving chamber where it makes a working-joint with the non-revolving flue-piece; also, an automatic circulation-cock at the closed end of the furnace for effecting a positive circulation of the water, and, in connection therewith, means for effecting the positive discharge of the air with the water, carrying off the heat, which air would otherwise accumulate within the water-spaces and interfere with such cooling circulation by displacing the water at the high parts of the water-spaces.

Various other features of my invention are involved in this furnace, which will be specifically described, and stated in the claims.

It may be mentioned in this connection that a non-revolving flue-piece with water-protection is not new; but its combination with an internal water-cooled joint on the revolving chamber, which of itself is entirely new and most important, is novel. Revolving furnaces, prior to my invention, had no means for effecting such circulation of water through or in contact with the joint-ring.

In the accompanying drawings, Figure 1, Sheet 1, represents an elevation of the side of a revolving furnace embracing my invention; Fig. 2, Sheet 1, a horizontal diameter section of the same; Fig. 3, Sheet 2, a top view of the same; Fig. 4, Sheet 2, an end elevation of the non-revolving part; Fig. 5, Sheet 3, a view of the closed end of the furnace; Fig. 6, Sheet 4, a section, on an enlarged scale, of a portion of the working-joint formed by the revolving and non-revolving parts of the furnace; Fig. 7, Sheet 3, a section, on an enlarged scale, of the fixed shell and revolving plug of the automatic circulation-cock and the water-jacket of the furnace, through which the cock provides a circulation; Fig. 8, Sheet 4, a cross-section through the recessed portion of the automatic circulation-cock and the inlet-pipe for the water on the line $x\,x$ of Fig. 7; Fig. 9, Sheet 4, a similar section taken in the line of the outlet-pipe for the waste water and the air-discharges, which communicate with the water-spaces of the furnace, on line $y\,y$ of Fig. 7; and Figs. 10 and 11, Sheet 4, an elevation and section of the open end of the furnace, showing a modification of a separate hollow wearing-ring, through which the water circulates.

The following is a general description and method of carrying out my invention: I employ a single revolving chamber, C, of any convenient form, and line it with any suitable refractory material, and cause it to be revolved by any ordinary means upon rollers R or other bearings. The means shown for effecting the revolving motion of the furnace consist of a cogged gear, G, secured to the closed end of the furnace, with which a screw, S, matches, driven by double-acting engines E. One end of the furnace-chamber C is open at $C^2$, and the other end is closed at $C^3$ and provided with a water-back. A flue-piece, F, is employed at the open end of the furnace, and is so mounted upon a fixed standard, $S^2$, Figs. 1 and 4, at one side of the furnace, as to allow it to be swung open from and closed with the chamber, to form a working-joint therewith, in order to render the flue-piece available as a cover for the opening $C^2$ in the revolving chamber. (See Fig. 2.) The fuel is supplied to the chamber C through this flue-piece, and the products of combustion make their exit through the same opening in the furnace, which is covered by the movable flue-piece, and which connects the single chamber with the chimney A by a fixed part of the flue $A^2$ attached thereto.

The flue-piece is opened upon its standard for giving access to the furnace; or it may have an opening covered with a door sufficiently large to work the furnace without moving the flue-piece for that purpose.

The single furnace-chamber is heated, by preference, with a mixture of powdered fuel and a proportionate quantity of air injected through the flue end at such velocity that the streams of fuel and air will reach the farther or closed end of the chamber and return therefrom into the flue-piece, and thence into the chimney, allowing ample time for the generation of the gases and their perfect combustion, the velocity also being such as to prevent the incoming currents on entering the furnace through the flue-piece from being deflected materially by the returning currents from the chamber.

The movable flue-piece has an opening at its end remote from its turning-point, which forms a junction with the chimney flue-piece $A^2$, and is lined with a suitable refractory material. It is mounted upon the fixed standard $S^2$ by a bracket-sleeve, $S^3$, through which the standard passes, and which sleeve is supported by a disk, D, resting and made to turn upon balls $a$, arranged within a base, to allow the flue-piece to be readily opened and closed, as shown in Fig. 1.

The entrance of the fuel and air into the furnace is effected through a pipe, P, or pipes, passing at one side of the flue-standard, so that there may be no change in the fixed part of said pipes as the flue-piece is moved upon its support; or the fuel and air may be supplied through adjustable pipes, or pipes which are capable of being removed, without regard to the flue-piece, from the front of the furnace when the flue-piece is moved aside to give access to the furnace; or the furnace may be made capable of being removed from the flue-piece and the injecting-pipes arranged accordingly.

In some cases, also, these pipes may be arranged so that on the removal of the flue-piece or door the pipes may be allowed to remain, permitting the fuel and air to be injected into and keeping hot the furnace. In the construction shown, however, the fuel and air conveying pipe P is such as to allow of the fuel and air being directed onto the material under treatment or away from it, as desired. This is effected by making the pipe with one or more joints, Q, at the bends thereof, terminating in a nozzle, N, so as to give the jointed sections a sort of universal adjustment—that is, a capacity for being raised above the flue-piece and of varying the angle of its nozzle N with respect to the opening O, Fig. 2, in the outer side of the flue-piece or furnace. This nozzle has a flat rectangular form, by preference, and is oblong to fit a section of the opening O, the position of which opening may be varied, as required, by opening any one of a series of narrow doors, $b$, hinged to the flue-piece side and covering a large opening, O, therein, so as to allow of adjusting the angle of the nozzle to inject the fuel and air directly upon the material or away from it. The narrow doors $b$ are secured, when closed, by slide-latches $c$, fitted into a guide-bar, $d$. By means of these doors such a position may be chosen for the injecting-pipes, as the metal boils up, as will prevent an overflow into the fuel-injecting pipes, the point of discharge of the products of combustion from the flue-piece into the chimney being also at such a height as will prevent an overflow of metal into the chimney, by which means I am enabled to work a much larger charge in a given-size furnace than would be the case if the inlet and outlet were fixed, as they are when a separate combustion-chamber is used.

For the purpose of maintaining the proper mixture or intermingling of fuel and air when passing the curves in the pipes carrying them into the furnace, I combine with the conveying pipe or pipes P at the bend or bends thereof a series of divisions, $e$, Figs. 2 and 3, forming several channels, through which the fuel and air must pass, and thereby prevent the fuel from being carried by its weight and consequent superior centrifugal force to the outside of the curves and entering the furnace in an unmixed condition. A separation takes place in the multiplied channels; but a sufficient average diffusion of the fuel is maintained where the straight pipes lead off from the curves to cause the necessary commingling of the air and fuel before they are delivered into the furnace. This is highly important, as the proper combustion of the powdered fuel and air depends upon a proper mixture thereof. Several separate and distinct pipes may be used to effect this division and commingling of the fuel.

In some cases combustible oil or liquid fuel may be substituted for powdered fuel by injecting it into the furnace with the requisite quantity of air from the same points and in the same directions as that desired for powdered fuel, by means of any of the well-known devices for injecting oil and air into ordinary furnaces.

In the working of the single-chamber furnace having a closed end the heat will be such at that point that if left unprotected by water a great destruction of the lining would result from the direct impingement of the projected products of combustion. To avoid such difficulty, I construct the closed end of the furnace with a water-jacket, J, Fig. 2, formed by the closed end of the chamber proper and an outer casing, within which a circulation of water takes place, and in this connection, and by means of the water-back thus formed, extend such circulation not only to the circumferential walls of the chamber W or cylinder by a circumferential jacket, $W^2$, but to the joint-ring $J^2$, at the open end, connecting with such jacket, thus maintaining a circulation by means of the automatic circulation-cock B from and to such cock at the closed end of the chamber. The means whereby to effect such circulation will be fully described hereinafter.

I have described and shown the flue-piece F as swinging upon a fixed standard, $S^2$, to bring its joint-ring K in contact with the joint-ring $J^2$ of the working-chamber. In such function of the flue-piece it would be liable to the warping action and the disturbing expansion of the heat from the furnace, and, moreover, requires that the joints shall be maintained in a plane to enable the flue-ring to bear evenly against the revolving joint-ring. For this purpose I mount the flue-piece upon a pivot-point, Z, Fig. 4, under the bottom of the flue-piece, which pivot is carried by the bracket $Z^2$ from the sleeve $S^3$, and combine with such sleeve a shelf-plate, $f$, upon which rests an angle-iron, $g$, or bracket, firmly secured to the flue-piece, and provide such angle-iron $g$ with slots $h$, Fig. 2, having a curve concentric with the pivot Z of said flue-piece, and through these slots $h$ stud-bolts from the shelf pass, by which to hold the angle-iron $g$ to the shelf $f$, and allow it to have an adjustment thereon by means of an adjusting-screw, $i$, having its bearing in a nut, $i^2$, carried by the angle-iron, and with the point of said screw confined in a socket, $j$, on the sleeve $S^3$, so that by turning the screw $i$ so as to draw the angle-iron to or from the sleeve the horizontal parallelism of the joint-rings $J^2$ K can always be maintained to compensate for expansion of the furnace or wear of the joint-rings. In this adjustment the flue-piece F is made to turn upon its supporting-pivot. The vertical parallelism of the flue-piece is secured by means of a swinging clamp-screw, H, upon the fixed portion $A^2$ of the flue-piece arranged in a line horizontal through the axis of the wearing-rings and the adjusting-screw $i$.

This construction and arrangement is equivalent to a single set-screw arranged and acting in the line of the axis of the chamber, to permit of a vertical parallelism of the two rings, while the horizontal parallelism is adjusted from time to time by the screw $i$, as expansion or wear may require, and in this way a satisfactory adjustment of the two wearing-rings with respect to each other is effected and maintained, and the joint made to wear uniformly and preserve the requisite tightness.

The working screw or clamp H is carried by a pivoted arm, $k$, so as to admit of its being turned aside in opening the flue-piece.

The water for cooling the furnace is supplied from a suitable head or pressure through a supply-branch, U, and cock B, which is fixed at the closed end of the revolving cylinder, concentric with its axis, and extends outward therefrom and terminates in a conical end or plug, $B^2$, Fig. 7, which fits into a non-revolving shell, I, forming a manifold plug-cock.

The supply-pipe U connects with an annular recess, $m$, either in the plug or shell of the cock, which recess $m$ leads to and has constant connection with a central way, $B^3$, through the cock B to its furnace end, where it communicates with a radial pipe, $K^2$, Figs. 2 and 5, which extends on the outer side of the jacket J of the closed end of the furnace until it reaches a point opposite the annular jacket of the furnace-cylinder, into which it projects through the head and extends as far as the jacket M of the open end of the furnace, where it delivers the cold water at $z$, Fig. 2.

The water carries off the heat through a series of pipes, T, which are situated equidistant round the circumference of the closed end of the furnace, and converge until they connect with a series of discharge-ways, $n$, which surround the central supply-way, $B^3$, through the cock, and terminate in a corresponding number of ports, $s$, in the plug, which have alternate communication with a recess, $t$, Figs. 7 and 9, in the shell I, to which is attached a single discharge, $U^2$. These ports $s$ are so arranged that they only permit a discharge from one end of the series of pipes T at a time which is uppermost, or a partial discharge from two pipes, T, which may be uppermost, equivalent to one pipe, as shown by the dotted line $x$, Fig. 5, and thereby compel the waste water and air to find their exit through the pipe T, which is uppermost, or the two pipes, either when the furnace is revolving or stationary, preventing the accumulation of air, which would occupy space which should be occupied by water.

To render this construction efficient in its action in removing the air, I make the head of the closed end of the furnace considerably larger, as at $p$, Fig. 2, than would otherwise be necessary for water alone, and enlarge the outside shell of the furnace, by preference, for a short distance at this end, or all the way, if desirable, so as to obtain an annular space or chamber, $q$, of sufficient diameter, so that in case the two uppermost exit-pipes T should be equidistant from a vertical central line when the furnace is being revolved or is stationary, the air could not accumulate below a horizontal line above the inner skin drawn from the end of one exit T to the corresponding end of the other exit-pipe, as in Fig. 5, thereby insuring that the inside shell shall be always covered with water.

The shell I of the cock B is not rigidly fixed, but is only prevented from revolving with the plug by a lever, V, having a limited freedom, and is permitted to partake of any irregular motion of the revolving parts by means of flexible connections with the fixed supply and discharge pipes U $U^2$ of the shell.

In the drawings, the shell-lever V is shown as being confined at its lower end within an oblong slot, $r$, Fig. 5, to give it that amount of freedom which is necessary to prevent destructive contention between the revolving and non-revolving parts.

The joint-rings $J^2$ K of the furnace are made hollow and integral parts of the double shells, and communicate directly all round with the water-spaces thereof; or they may be secured to the outside surface of the outer shell of the revolving furnace and flue-piece, as shown in Figs. 10 and 11, and all the water supplied to the furnace and flue-piece compelled to traverse these hollow rings, by connecting the supply-pipes at one point of the rings and making the discharge therefrom into the jacket at a point diametrically opposite the supply.

The flue-piece F is constructed with a water-jacket, $F^2$, and a wearing-ring, K, similarly applied, and the water introduced by a fixed pipe, $W^3$, which joins the flue-piece by a flexible connection, X, while the discharge is made through a flexible pipe, $X^2$, leading from the top of the flue-piece to a circular drain concentric with the sleeve $S^3$, upon which the flue-piece turns, whereby such movement does not break continuous connection with the drain. The relation of these two water-cooled joint-rings is a matter of the last importance in a furnace requiring a joint between the revolving and non-revolving parts, as by such combination the power for working the furnace is reduced to a minimum, waste of material is prevented by leakage between warped, cracked, and dislocated joint-rings, and the wear and tear, and consequent loss of time, are prevented to a very important extent.

I desire to state here that in my English patent of 1872 I used a revolving furnace consisting of two divisions on the same axis; but in practice I found that by stopping up the division between the two chambers and converting the working-chamber into a combustion-chamber as well, by injecting the fuel in at the open end the combustion was more perfect, and resulted in my present invention of a single revolving combustion and working chamber combined, and developed at once a great saving of fuel and cost of construction.

I have described the series of pipes at the closed end of the furnace as the means for effecting the discharge of both the water and air; but this arrangement is more specifically designed to effect the discharge of the air, as the water may be got rid of by a single pipe connecting in any suitable manner with the cock.

By the term "automatic" I mean that the cock will discharge the water down to an established line, and no lower, and that such discharge will take place whether the furnace be revolving or standing, as all the discharge-pipes T, as they descend below the water-line, (by the revolution of the furnace,) are shut off automatically by the several ports or ways $n$ in the plug connecting with the several radial pipes.

By "positive" discharge of air and water it is meant that the air is forced to escape either with the water or separately before it can accumulate below the established water-line. This is accomplished by the automatic closing of all the discharge-ports of the cock connecting with the radial pipes, which are for the time being below that line, and without regard to the movement of the furnace.

The following is claimed by me as new in revolving puddling-furnaces, namely:

1. A puddling-furnace consisting of a single revolving chamber, C, which is the gas-producing chamber, the combustion-chamber, and the working or utilizing chamber enveloped in a water-tight jacket, and having a joint-wearing ring, $J^2$, communicating with said jacket, and cooled by an automatic water-circulation, as described, in combination with a flue-piece, F, provided with a similar joint wearing-ring, K, cooled as described.

2. A revolving puddling-furnace enveloped with a water-tight jacket extending over the closed portions of its open end, in combination with the wearing joint-ring $J^2$, revolving therewith and cooled by a circulation from water-tight jacket, substantially as herein set forth.

3. The combination, with a rotary puddling-furnace and a water-back, of an automatic axial circulation-cock, B, and the radial supply-pipe $K^2$, connecting it directly with the furnace-jacket, for effecting a positive circulation of water supplied to cool the furnace, substantially as herein set forth.

4. The combination, with a revolving puddling-furnace and a water-back, J, of an automatic circulation-cock, B, a series of radial pipes, T, and an annular enlargement, $p$ $q$, of the water-jacket, connecting the cock with the water-back, whereby the air-line in the jacket is always kept above the outside surface of the inner shell of the furnace and made to communicate with one, or partially with two, of the uppermost pipes only, whether the furnace be running or standing, substantially as herein set forth.

5. In a revolving puddling-furnace, the combination of a central supply and discharge cock revolving therewith, and a non-revolving shell enveloping the outer end of said cock having an inlet and an outlet for the water, and held in position by a stop-arm, V, and an endwise-acting spring, whereby to accommodate itself to any irregularity of the cock in its revolutions incidental to bad workmanship, expansion, or distortion by heat, substantially as herein set forth.

6. The combination, in a revolving puddling-furnace, of a supply and discharge cock revolving therewith and within a self-adjusting shell with the radial supply-pipe $K^2$ and the horizontal continuation-pipe discharging near or into the wearing-ring, substantially as herein set forth.

7. The combination, with a revolving puddling-furnace open at one end only and consisting of a single gas-producing, combustion, and working chamber, C, of a flue-piece, F, without divisions, and having a single central opening into the furnace, through which the fuel is injected and through which the products of combustion make their exit into the flue-piece, and thence through a single side opening into the chimney, as herein set forth.

8. The combination, with a revolving puddling-furnace open at one end only and consisting of a single gas-producing, combustion and working chamber, C, and a flue-piece, F, having a through-opening, of a conducting-pipe, P, and injecting-nozzle N, communicating with the front opening, O, of said flue-piece, substantially as and for the purpose herein set forth.

9. The combination, with a revolving puddling-furnace open at one end only and consisting of a single gas-producing, combustion, and working chamber, and a flue-piece, F, having a through-opening for the passage of fuel and air into the furnace, of an adjustable injection-pipe, P N, whereby the direction at which the fuel and air are injected into the furnace may be varied in relation to the axis-line of the furnace, for the purpose set forth.

10. The combination, with a revolving puddling-furnace and a flue-piece without divisions covering the end of said furnace, of an adjustable injection-pipe, P N, and a series of narrow doors, $b$, whereby the angle and position of the nozzle is adapted to a narrow opening by opening any one of the sectional doors, substantially as herein set forth.

11. The combination, with a revolving puddling-furnace and a flue-piece, F, mounted to be turned to close and open the furnace end, of a nozzle and supply-pipe, N P, having joints Q, whereby the nozzle end and its jointed sections can be turned up out of the way of the opening and closing movement of the flue-piece, substantially as herein set forth.

12. The combination, with a revolving puddling-furnace and a flue-piece without divisions, of an injection-pipe, P N, having a series of divisions, $e$, at the bend or bends thereof, for the purpose set forth in this specification, and substantially as herein described.

13. The combination, with a revolving puddling-furnace, of a flue-piece, F, provided with mechanism which gives it a horizontal and vertical adjustment with relation to the wearing-ring of the revolving furnace, whereby the non-revolving flue-piece ring is caused to bear and wear evenly against the revolving furnace joint-ring, substantially as herein set forth.

14. The combination, with a revolving furnace and an adjustable flue-piece, F, mounted upon a pivoted connection, Z, upon a swinging bracket, $Z^2$, and steadied by a shelf thereon, of an adjusting-screw, $i$, whereby to effect and maintain the horizontal parallelism of the flue-piece with the furnace, substantially as herein set forth.

15. The combination, with a revolving puddling-furnace open at one end only, and the wearing-ring fixed to the open end and revolving therewith, of the flue-piece provided with a similar joint-ring, and having the contiguous surfaces of both rings cooled by a current of water passed continuously through them whether the furnace is standing or running, substantially as herein set forth.

T. R. CRAMPTON.

Witnesses:
  E. N. DREW,
     9 *Victoria Chambers, Westminster.*
  FRANCIS H. HAMILTON.